April 12, 1960
J. E. HENNING
2,932,598
GLASS FIBER TREATMENT
Filed Aug. 12, 1954
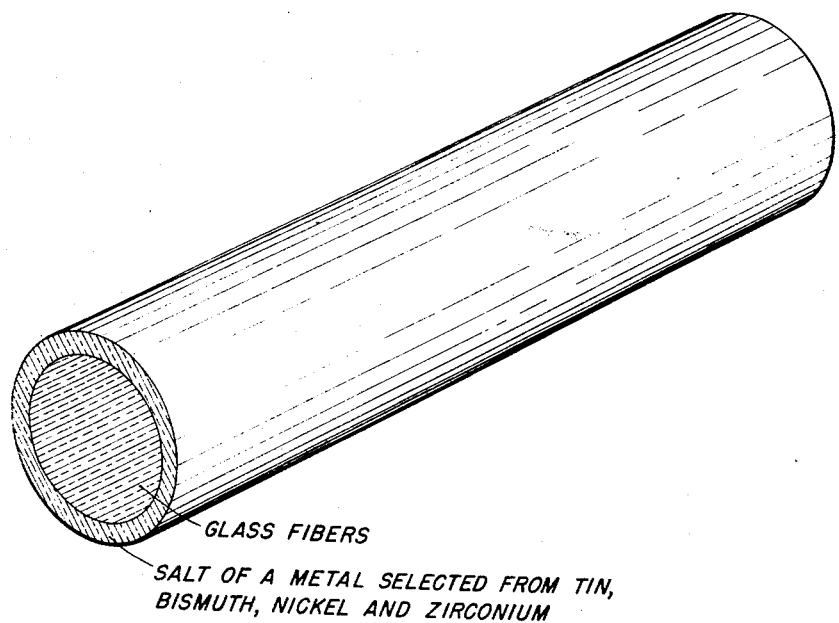
GLASS FIBERS
SALT OF A METAL SELECTED FROM TIN, BISMUTH, NICKEL AND ZIRCONIUM
INVENTOR.
JAMES E. HENNING
BY
Attorney

United States Patent Office 2,932,598
Patented Apr. 12, 1960

2,932,598
GLASS FIBER TREATMENT

James E. Henning, Madison, Wis., assignor to Bjorksten Research Laboratories, Inc., Madison, Wis., a corporation of Illinois Application August 12, 1954, Serial No. 449,511

28 Claims. (Cl. 154—128)

This invention relates to treated glass fiber and more particularly to a method for increasing the interlaminar adhesion between the surface of fibrous glass and synthetic resins.

One object of this invention is to provide a bond between glass fibers and cured polyester resins which is less susceptible to attack by water than the bond provided by either the bare glass or certain other commercial "sizing" treatments currently used.

Another object of this invention is to provide a laminate of increased physical strength characteristics.

Other objects and advantages of my invention will become apparent as the disclosure proceeds.

According to my invention I treat glass fibers with solutions or emulsions of certain organic or inorganic derivatives of metals, dry to remove the solvent, and subsequently heat the fibers to firmly affix the treating compound. I may provide a laminate made of such treated fibers and certain synthetic resins which, upon testing, provides values for strength properties which are improved over similar strength data from laminates made from untreated glass fibers.

Compounds suitable for use in the present invention include the reaction products of water soluble salts of nickel and unsaturated organic acids such as acrylic, methacrylic, or crotonic acids, a triphenyl bismuth derivative, tetraphenyl tin, and zirconyl salts such as the carbonate.

These compounds may be applied from a solution or, as in the case of the zirconium salt, from an emulsion in water.

It is necessary in all cases to dry the fibers after the application of one of these compounds to remove any solvent and to subsequently heat the treated fibers to firmly affix the compound applied.

The fibrous glass to which these compounds are applied may be either staple or continuous fibers in the form of yarns, mats, roving, or woven fabric. The surface of the glass fibers must be freed from all previous treatments by treating with a removal agent or preferably by heating to remove previously applied material.

The following examples serve to illustrate this invention but are not intended to limit it in any manner. Parts mentioned are by weight.

Example 1

| | Parts |
|---|---|
| Oleic acid | 1.2 |
| Ammonium hydroxide (1.15 normal) | 0.30 |
| Water | 45 |

These were heated with stirring to 80° C. and then at this temperature:

| | Parts |
|---|---|
| Zirconyl carbonate wax emulsion | 9.1 |
| Ceremul A (Socony-Vacuum Oil Co.) | 2.6 | were added with constant stirring. After emulsification and while still hot 39 parts of water and 2.4 parts of ethylene dichloride, which serves to stabilize the emulsion, are added.

This emulsion was applied to commercial satin weave 181 glass fabric by dipping and the treated fabric dried in a circulating air oven at 50° C. for 30 minutes. The dried cloth was then heated in a circulating air oven at a temperature of 140° C. for 30 minutes. The fabric thus treated was cut into 2" x 4" rectangles and 10 of these rectangles laminated together with polyester resin, Selectron 5003 (Pittsburgh Plate Glass Co.) catalyzed with 0.8% benzoyl peroxide under a pressure of 15 p.s.i. for 20 minutes at 221° C. The resulting laminate, when tested for flexural strength gave values of 46,400 p.s.i. dry and 25,200 p.s.i. after immersion in boiling water for 3 hours.

The method of application noted in the above example is not critical and any means for saturating the fibers with the treating solution may be employed. The drying temperature for the treated fabric is quite flexible and instead of the time and temperature given any time from, for example, 1 minute at 100° C. to 2 days at 20° C. may be substituted, this operation serving merely to remove the water. Other heat treatments may be used which give comparable results.

The treated fibers may be heated at temperatures between 120–180° C. and the duration of time at this temperature may be between 5 and 90 minutes.

In the place of "Ceremul A" in the above example, any wax emulsion will suffice, or, as illustrated in the following example, the wax component may be eliminated entirely.

Example 2

Zirconyl carbonate (7 parts) is diluted with 93 parts water and the solution applied to a commercial satin weave glass fabric. The fabric thus treated was dried at room temperature and subsequently heated in a circulating air oven for 10 minutes at 120° C. Laminates were prepared by the method described in Example 1, and the flexural strength data obtained were as follows: 58,900 p.s.i. dry and 26,500 p.s.i. after a 3-hour immersion in boiling water.

The heat treating in this case is not critical. Equally good results were obtained from cloth heated 5–15 minutes at temperatures from 70–150° C.

Example 3

Nickel carbonate, 4 parts, is dissolved in a solution of 81 parts water and 15 parts isopropyl alcohol. To this solution is added slowly, with stirring 2 parts of methacrylic acid. The resulting solution is applied to glass fabric as in the previous examples and the fabric air dried. The fabric was then heated in a circulating air oven for 60 minutes at 35° C.

A laminate prepared as in Example 1 from this fabric gave flexural strength values of 46,800 p.s.i. dry and 24,400 p.s.i. after three hours immersion in boiling water.

Example 4

Nickel chloride, 4.4 parts, was dissolved in a solution of 80 parts water and 13.4 parts isopropyl alcohol. To this solution was added dropwise with stirring, 2.2 parts of crotonic acid. The resultant solution was applied to the glass fabric and the fabric air dried. After heating the fabric in an oven for 30 minutes at 30° C., a laminate was prepared as described in Example 1. The flexural strength values of this laminate were 41,200 p.s.i. dry and 23,600 p.s.i. after three hours immersion in boiling water.

Example 5

4 parts of nickel sulfate were dissolved in a solution of 79 parts water and 15.4 parts isopropyl alcohol. To this solution was added dropwise, with stirring, 1.6 parts acrylic acid. The resultant solution was applied to glass fabric, the fabric dried, and placed in an oven at 25° C. for 70 minutes.

Laminates prepared from this treated fabric gave flexural strength values of 38,600 p.s.i. dry and 20,800 p.s.i. after three hours immersion in boiling water.

*Example 6*

Triphenyl bismuthine (E.K.) 0.5 part, was dissolved in ethanol, 99.5 parts, and the resulting solution applied to glass fabric as in the previous example, and the fabric dried. The dried fabric was then heated for 80 minutes at 40° C. and a laminate prepared. This laminate, when tested, produced flexural strength values of 37,100 p.s.i. dry and 22,500 p.s.i. after 3 hours immersion in boiling water.

*Example 7*

Triphenyl bismuthine, 1.48 parts, was dissolved in 98.52 parts isopropyl alcohol and the resulting solution applied to glass fabric. After drying the cloth was heated at 100° C. for 25 minutes and, upon testing a laminate prepared with polyester the flexural strength data obtained was 42,800 p.s.i. dry and 28,900 p.s.i. after a three-hour immersion in boiling water.

*Example 8*

Tetraphenyl tin, 1 part, was dissolved in 99 parts xylol and the resulting solution applied to a satin weave 181 glass fabric. After drying to remove the solvent the fabric was heated at 120° C. for 10 minutes. Laminates prepared from the treated fabric gave the following flexural strength data: 42,100 p.s.i. dry and 24,400 p.s.i. after three hours in contact with boiling water.

*Example 9*

5 parts of tetraphenyl tin were dissolved in 95 parts toluene, and the resultant solution applied to glass fabric. After air drying to remove the toluene the fabric was heated for 10 minutes at 200° C. The laminate prepared from this fabric had the following flexural strength properties: dry strength 35,400 p.s.i. and 21,200 p.s.i. after three hours immersion in boiling water.

The treating times for the application of solution in the preceding examples are not critical and the treatments may be conveniently applied at room temperature. I have found that optimum strength conditions may be achieved more rapidly by applying the solution while hot to the fabric, using temperatures, in some cases, approaching the boiling point of the solvent used.

In place of nickel methacrylate, nickel acrylate, or nickel crotonate, I may use any nickel salt of an unsaturated organic acid with less than 6 carbon atoms such as 2-methyl crotonic, 3-ethyl crotonic, 2,3 ene,-pentanoic acid or the like. In the place of tetraphenyl tin, I may use di-ethyl diphenyl tin, triphenyl ethyl tin, triphenyl methyl tin, dimethyl diphenyl tin or the like. For triphenyl bismuthine may be substituted diphenylmethyl bismuthine, diethyl phenyl bismuthine, diphenyl ethyl bismuthine, isopropyl diphenyl bismuthine or the like. In the place of zirconyl carbonate, I may use the acetate, propionate or butyrate or any derivative of an acid having an ionization constant of less than $2 \times 10^{-5}$.

While this invention has been described in detail as to the preferred method of application it will be obvious to those skilled in the art that certain modifications and changes are possible without departing from the spirit of the invention, and its scope is intended to be limited only by the claims.

A treated glass fiber made in accordance with the invention is shown in the drawing.

Having thus disclosed my invention, I claim:

1. The process of treating glass fibers to provide improved interlaminar strength when laminated with organic synthetic resins which consists of applying to the glass fibers a mixture with water of from 3 to 12% of zirconyl carbonate, drying at from 20–90° C. to remove water, and then heating the treated glass fibers to a temperature of 20–200° C. to firmly attach the metal salt thereto and subsequently laminating the treated fibers with a synthetic organic resin.

2. The process of claim 1 in which the zirconyl carbonate is applied from a 6 to 8% emulsion.

3. The process of claim 2 in which the glass fibers are heat-treated after the salt is applied and dried at a temperature of 70–150° C. for 5 to 15 minutes.

4. The process for treating fibrous glass which comprises the application to the glass of a 1 to 5% solution of tetraphenyl tin in an organic solvent, drying to remove the solvent, and subsequently heating at 20–200° C. to firmly attach the treating compound and subsequently laminating the treated fibers with a synthetic organic resin.

5. The process in claim 4 in which the tetraphenyl tin is applied from a 2% solution and in which the fibrous glass is treated with the metal compound, dried, and subsequently heated at 70–150° C. from 5 to 25 minutes.

6. The process for treating glass fibers for the purpose of increasing the adhesion between the glass surface and organic synthetic resins which comprises the application to the fibers of a 0.5 to 2.0% solution of triphenyl bismuthine, drying the fibers to remove the solvent, and subsequently heating the fibers at 40–160° C. to firmly affix the metal compound and subsequently laminating the treated fibers with a synthetic organic resin.

7. The process of claim 6 in which the triphenylbismuthine is applied from a 1.5% solution in ethanol.

8. The process of claim 7 in which the glass is treated, dried, and subsequently heated at 90–140° C. from 5–40 minutes.

9. An article of manufacture comprising fibrous glass to the surface of which has been applied tetraphenyl tin and the whole enclosed by a sheath of synthetic resin, the tin compound serving to integrally bond the glass to the resin.

10. An article of manufacture, comprising fibrous glass to the surface of which has been applied triphenyl bismuthine and the whole enclosed by a sheath of synthetic resin, the bismuth compound serving to integrally bond the glass to the resin.

11. An article of manufacture comprising fibrous glass to the surface of which has been applied nickel methacrylate and the whole enclosed by a sheath of synthetic resin, the nickel compound serving to integrally bond the glass to the resin.

12. An article of manufacture comprising fibrous glass to the surface of which has been applied nickel acrylate and the whole enclosed by a sheath of synthetic resin, the nickel compound serving to integrally bond the glass to the resin.

13. An article of manufacture comprising fibrous glass to the surface of which has been applied nickel crotonate and the whole enclosed by a sheath of synthetic resin, the nickel compound serving to integrally bond the glass to the resin.

14. An article of manufacture comprising fibrous glass to the surface of which has been applied zirconyl carbonate and the whole enclosed by a sheath of synthetic resin, the zirconium compound serving to integrally bond the glass to the resin.

15. A process for treating glass fibers to provide improved interlaminar bonds between the glass and organic synthetic resins which comprises immersing preformed glass fibers in a solution of a compound selected from the group consisting of alkyl derivatives of tin, aryl derivatives of tin, aklyl derivatives of bismuth and aryl derivatives of bismuth, nickel salts of unsaturated organic acids of less than 6 carbon atoms and zirconium salts of acids having ionization constants of less than $2 \times 10^{-5}$ and heating at 25° C. to 200° C. and subsequently laminating the treated glass fibers with a synthetic organic resin.

16. The process in claim 15 in which the impregnating compound is triphenyl bismuthine.

17. The process in claim 15 in which the impregnating compound is tetraphenyl tin.

18. A process for treating glass fibers to provide improved interlaminar bonds between the glass and organic synthetic resins which comprises immersing preformed glass fibers in a solution of a compound selected from the group consisting of nickel salts of unsaturated organic acids of less than six carbon atoms, and heating at 25° C. to 200° C. and subsequently laminating the treated glass fibers with a synthetic organic resin.

19. The process in claim 18 in which the impregnating compound is nickel methacrylate.

20. The process in claim 18 in which the impregnating compound is nickel acrylate.

21. The process in claim 18 in which the organic acid is methacrylic acid.

22. The process in claim 18 in which the organic acid is acrylic acid.

23. A process for treating glass fibers to provide improved interlaminar bonds between the glass and organic synthetic resins which comprises immersing preformed glass fibers in a solution of a compound selected from the group consisting of zirconium salts of acids having ionization constants of less than $2 \times 10^{-5}$, and heating at 25° C. to 200° C. and subsequently laminating the treated glass fibers with a synthetic organic resin.

24. The process in claim 23 in which the impregnating compound is zirconyl carbonate.

25. An article of manufacture comprising fibrous glass to the surface of which has been applied a compound selected from the group consisting of alkyl derivatives of tin, aryl derivatives of tin, alkyl derivatives of bismuth and aryl derivatives of bismuth, nickel salts of unsaturated organic acids of less than 6 carbon atoms and zirconium salts of acids having ionization constants of less than $2 \times 10^{-5}$ and the whole enclosed by a sheath of synthetic resin, said compound serving to integrally bond the glass to the resin.

26. An article of manufacture comprising fibrous glass to the surface of which has been applied a compound selected from the group consisting of zirconium salts of acids having ionization constants of less than $2 \times 10^{-5}$ and the whole enclosed by a sheath of synthetic resin, said compound serving to integrally bond the glass to the resin.

27. An article of manufacture comprising fibrous glass to the surface of which has been applied a compound selected from the group consisting of nickel salts of unsaturated organic acids of less than six carbon atoms and the whole enclosed by a sheath of synthetic resin, said compound serving to integrally bond the glass to the resin.

28. A process for treating glass fibers to provide improved laminar bonds between the glass and organic synthetic resins which comprises the steps of immersing preformed glass fibers in a solution of a compound selected from the group consisting of alkyl derivatives of tin, aryl derivatives of tin, alkyl derivatives of bismuth, aryl derivatives of bismuth, nickel salts of unsaturated organic acids of less than 6 carbon atoms and zirconium salts of acids having ionization constants of less than $2 \times 10^{-5}$ and heating at 25° C. and subsequently laminating the treated fibers with a synthetic organic resin.

References Cited in the file of this patent

UNITED STATES PATENTS

| | | |
|---|---|---|
| 2,315,259 | Hyde | Mar. 30, 1943 |
| 2,424,262 | Wainer | July 22, 1947 |
| 2,482,816 | Van Mater | Sept. 27, 1949 |
| 2,502,411 | Nehek et al. | Apr. 4, 1950 |
| 2,577,936 | Waggoner | Sept. 11, 1951 |
| 2,671,033 | Waggoner | Mar. 2, 1954 |
| 2,699,415 | Nachtman | Jan. 11, 1955 |